United States Patent [19]
Smith, Jr. et al.

[11] Patent Number: 5,238,563
[45] Date of Patent: Aug. 24, 1993

[54] MULTI-ELEMENT HOUSING

[75] Inventors: Dean L. Smith, Jr., Mountainside, N.J.; Charles P. Darnell; Tan-Jen Chen, both of Baton Rouge, La.; Richard J. Basile, Wharton; Burghard H. Ruterbories, Morris Plains, both of N.J.; David H. Hopkins, Escondido, Calif.

[73] Assignee: Exxon Research & Engineering Company, Florham Park, N.J.

[21] Appl. No.: 921,875

[22] Filed: Jul. 29, 1992

[51] Int. Cl.$^5$ .............................................. B01D 63/12
[52] U.S. Cl. .......................... 210/321.74; 210/321.8; 210/321.89; 210/500.23
[58] Field of Search ........... 210/321.6, 321.64, 321.72, 210/321.78, 321.79, 321.8, 321.81, 321.87, 321.88, 321.89, 321.9, 541, 542, 500.23, 321.74

[56] References Cited
U.S. PATENT DOCUMENTS
4,790,942 12/1988 Shmidt et al. ...................... 210/650

FOREIGN PATENT DOCUMENTS
253944 1/1988 European Pat. Off. .
3507908 9/1986 Fed. Rep. of Germany .
4008742 9/1991 Fed. Rep. of Germany .
587959 1/1978 U.S.S.R. .

Primary Examiner—Frank Sever
Attorney, Agent, or Firm—Joseph J. Allocca

[57] ABSTRACT

A multi-element housing is disclosed for the containment of multiple membrane separation elements in parallel. The multi-element housing is characterized in that the elements are grouped in parallel with a feed/retentate zone, defined by a space enclosed by two tube sheets arranged at the same end of the elements. The central mandrels of the elements pass through the feed/retentate zone space defined by the two tube sheets and empty permeate outside the defined space into a permeate collection zone from which it is removed, while the tube sheet directly attached to the element is in open relationship to the interior of the membrane element and retentate accumulates in the space between the top tube sheet and the bottom tube sheet from which it is removed.

8 Claims, 5 Drawing Sheets

MULTI-ELEMENT HOUSING

BACKGROUND OF THE INVENTION

1. Field of the Invention

The invention relates to a multi-element housing for the containment of multiple membrane separation elements, preferably spiral wound elements, mounted in parallel in a containment vessel.

2. Description of the Related Art

In the past when multiple elements have been housed in parallel within a single pressure containment vessel the tube sheets used to produce separate feed/retentate and permeate zones have been mounted at opposite ends of the membrane elements. This has resulted in difficulties being encountered in the installation of and replacement of membrane elements in the housing because of space limitations between the membrane elements and the short distances between the opposing tube sheets. Normally, to replace even a single element, it has been necessary to disassemble the top or bottom tube sheet from all the elements in the housing. Alignment problems have also been encountered and strict machining protocols and procedures are required to assure precise alignment between the element mounting flanges on the opposing faces of the tube sheets.

DESCRIPTION OF THE INVENTION

Figure 1:
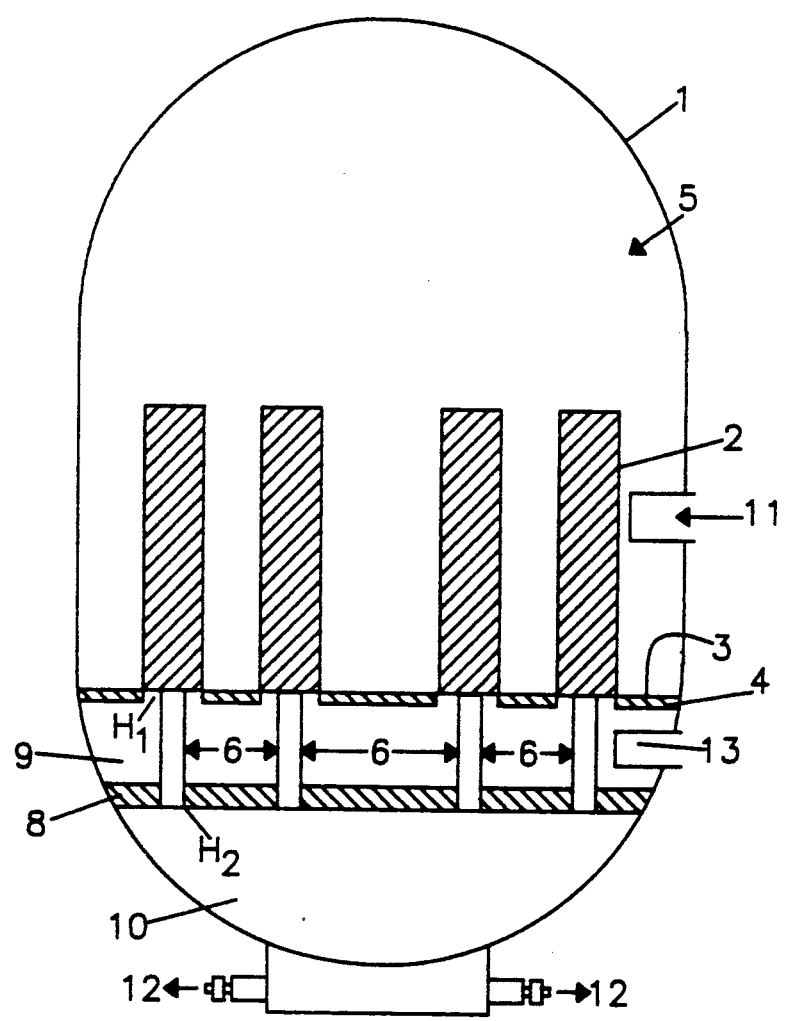
FIG. 1 is a schematic of an embodiment of a multi-element housing of the present invention.

A membrane element housing is disclosed for the containment of multiple membrane separation elements, preferably spiral wound elements, in parallel. The elements are grouped in parallel within a containment vessel. A feed/retentate space is defined by two tube sheets/flange plates arranged in parallel in close proximity to each other and at the same end of the elements and in fluid tight arrangement with the interior walls of the containment vessel. Grouping the tube sheets at the same end of the membrane elements alleviates alignment problems and simplifies element placement and replacement because of the additional space available within which to work. It also eliminates the need for complete housing disassembly for element replacement. The feed/retentate space is in open relationship with the interiors of the membrane elements. The membrane elements are preferably spiral wound elements and the invention will be described with reference to spiral wound elements. Other elements may be utilized such as hollow fiber elements with due attention being paid to the specific requirements which must be met in their construction. Thus, where in the case of a spiral wound element a central mandrel is described, in a hollow fiber element the corresponding element of construction would be a permeate collection tube.

In spiral wound elements layers of selective membrane are glued around three edges enclosing permeate spacer material defining a permeate envelope, with layers of feed/retentate spacer material between each complete permeate envelope. These alternating layers of feed/retentate spacers and permeate envelopes are spirally wrapped around a hollow central mandrel core which is in fluid communication with the interior of the permeate envelope through the unglued fourth edge of the permeate envelope, and define a membrane module. The hollow central mandrel is closed at one end and open at the other. The open end of the central mandrel extends beyond the spiral windings of the membrane module. The exterior of the spiral module is enclosed in a wrapping to prevent it from unwinding and thus producing an element. Multiple elements are fitted into a pressure containment vessel. The pressure vessel is defined by an upper chamber in which the membrane elements are arranged in parallel. This upper chamber is defined by the interior walls of the pressure containment vessel and the top face of a first tube sheet, which tube sheet is in fluid tight communication with the interior walls of the pressure containment vessel. The membrane elements are attached to the first tube sheet. In one embodiment the tube sheet contains a pattern of multiple holes equal in internal diameter to the external diameter of the membrane elements. The elements are fitted into these holes in fluid tight arrangement. In an alternate embodiment the first tube sheet contains a pattern of multiple holes equal in internal diameter to the external diameter of the central mandrel. Surrounding each such hole is an additional series of smaller secondary holes aligned with the feed/retentate spiral windings of the spiral wound element and bounded by the perimeter of the element whereby retentate passes from the element through the secondary holes into a lower chamber as further described below. Feed introduced into this upper chamber through feed entrance means in the wall of the pressure containment vessel adjacent to the upper chamber will be forced to pass through the spiral wound elements and cannot by-pass those elements. Because of the holes into which the elements are fitted, this first tube sheet is in open relationship with the interior, e.g. The spiral windings, of the elements. In the alternate embodiment, the secondary holes surrounding the central mandrel enclosing holes are in open relationship with the interior, e.g., spiral winding, of the elements. Thus, feed/retentate passing through the elements passes through this first tube sheet. The pressure vessel is also defined by a lower chamber, defined by the bottom face of the first tube sheet and a top face of a second tube sheet, both tube sheets arranged at the same ends of the elements in parallel to each other and in spaced apart relationship and in fluid tight communication with the internal walls of the pressure containment vessel. This lower chamber serves as a fed/retentate accumulation zone. The accumulated feed/retentate is removed from this zone through feed/retentate removal means in the wall of the pressure containment vessel located adjacent to this zone. The second tube sheet is pierced by the extended open end of the central mandrels passing through holes in the second tube sheet which holes correspond to and are in alignment with the multiple hole pattern of the first tube sheet. The holes are fluid tight around such extended mandrels. Permeate passing from the feed through the membrane into the permeate zone of the element (e.g., permeate envelope of a spiral wound element) migrates to the central mandrel and then passes through the central mandrel past the second tube sheet and exits through the open end of the central mandrel into a permeate collection zone. In the alternate embodiment the two tube sheets are attached to each other by lengths of pipe of internal diameter equal to the external diameter of the central mandrels and fluid tight attached, e.g., welded between the tube sheets axially aligned with the holes in said tube sheet through which the central mandrels pass. Thus, the central mandrels are inserted into the aligned holes joined by the welded-in-place lengths of pipe and fit into the lengths of pipe. The spiral wound element is end capped with an anti-telescoping device which serves also as a mounting means for attaching the element to the first tube sheet. This mounting means produces a fluid tight seal between the exterior of the element and around the secondary holes in the first tube sheet aligned with the feed/retentate spacers of the element so that the feed entering the upper chamber cannot by-pass the elements but must pass through the elements. The feed/retentate passing through the element passes through the secondary holes into the lower chamber. The permeator collection zone is defined by a space in the pressure vessel bounded by the walls of the pressure vessel and a bottom face of the aforesaid second tube sheet. The collected permeate is withdrawn from the permeate collection zone through permeate removal means fitted into the wall of the pressure containment vessel in the area adjacent to the permeate collection zone.

Thus it is seen that in this embodiment the pressure containment vessel is divided into three distinct zones of chambers, an upper chamber defined by the walls of the pressure vessel and the top face of the first tube sheet, a lower chamber defined by the walls of the pressure vessel and between the bottom face of the first tube sheet and top face of the second tube sheet, said tube sheets being spaced apart and parallel to each other, and a permeate collection zone underneath the lower chamber and defined by the walls of the pressure vessel and the bottom face of the second tube sheet. In the preferred embodiment the tube sheets are connected by the previously described lengths of pipe welded between the tube sheets and axially aligned with the holes in each tube sheet through which pass the central mandrels of the spiral wound element mounted to the top face of the first tube sheet.

As compared to the containment vessels of the prior art in which the tube sheets were arranged in parallel but at the opposite ends of the membrane elements, arrangement of the tube sheets in parallel but at the same end of the elements requires alignment only of the holes needed to secure only one end of the elements and the extended mandrels thereby greatly facilitating assembly of the element array and making maintenance and element replacement much simpler.

Any number of elements may be housed in a single multiple element housing, depending only on the design requirements of the operator. Typically the multiple elements will be housed in a cylindrical housing and mounted on a circular first tube sheet and arranged in a simple, staggered geometric pattern, spaced far enough apart to facilitate easy access to all elements for installation, removal or other maintenance or replacement.

Elements are attached to the first tube sheet in fluid tight arrangement by any of the typical attaching techniques. Elements can be inserted into the holes then swag locked in place. Alternatively the element can be located over the hole in the first tube sheet and a bead of sealant or adhesive can be run around the seam between the element and the tube sheet. The element can be individually fitted with attachment means such as flanges having holes which align with screw threads projecting from the tube sheet. In the embodiment where the tube sheet has a central mandrel hole and secondary holes within the perimeter of the elements for passage of retentate into the lower chamber, element mounting can be accomplished by fitting the end of the spiral wound element with a mounting flange which is gasketed and bolted to the first tube sheet. This mounting flange can be a separately added piece or it can be integrated with the anti-telescoping devices typically used in fabricating spiral wound elements to produce a single piece of hardware functioning as both anti-telescoping devise and mounting flange.

The projecting extended central mandrels can be likewise secured in the fluid tight arrangement by any of the typical attaching techniques. The projecting extended end of the mandrel can be secured using mounting flanges secured to the ends of the mandrel, and bolted to the bottom face of the second tube sheet. The mandrel and the flange can be secured by using "O" rings or by screwing the mandrel end, if threaded into corresponding threads cut into the flanges. In the embodiment wherein the tube sheets are attached by lengths of pipe axially aligned with holes on the tube sheets through which pass the central mandrels, the central mandrels passing through said pipe lengths can be fluid tight secured by gaskets or "O" rings fitted around the lengths of the mandrels inserted into the lengths of pipe thus forming a seal between the exterior wall of the mandrel and the interior wall of the length of pipe. The mandrels and lengths of pipe can have circumferential grooves cut into their complimentary faces into which fit the "O" rings, but this is not necessary. The extended ends of the mandrels can also be threaded and the elements thereby secured to the second tube sheet by nuts or by threads cut into the corresponding holes in the second tube sheet. The nuts can be either individually and separately attached to they can be welded into place at the end of the short pipe piece at the bottom face of the bottom (second) tube sheet and the entire element simply screwed into place. Similarly, if the short lengths of pipe are not employed the extending central mandrels, threaded at the far end, can be secured to the second tube by nuts welded to either the top or bottom face of the second tube sheet or by threads cut into the corresponding holes in the second tube sheet.

It is preferred that the attaching techniques employed be of the reversible type, that is, that the attached elements be easily removable for replacement or maintenance. For this reason it is preferred that welding not be practiced.

As previously stated the pressure containment vessel may be circular in design, but other configurations are also possible. Thus multi-sided vessels can be used, e.g., vessels of 6 or 8 sides can be used, but circular vessels are preferred as being easier to fabricate and as having fewer assembly interfaces in their construction thus being stronger and less susceptible to leakage.

The pressure containment vessel need not be fabricated as single piece but can a include top plate or covered dome attached by flange means mated to matching complementary flanges attached to parallel vessel side walls, in the case of a circular vessel, to cylindrical walls. The lower chamber can be completely independent and fitted as a separate assembly under the upper chamber. In this embodiment the vessel wall corresponding to the lower chamber wall comprises a circular collar fitted with flanges along both edges. The upper flange corresponds to a flange fitted along the lower edge of the upper chamber walls and the lower flanges corresponds to a flange fitted along the edge of the bottom piece of the vessel defining the permeate collection zone. The aforesaid tube sheets would fit between the corresponding flanges and, after application of appropriate sealing means, such as O-rings, beads of sealant, caulking, or gaskets would be cinched down between the flanges forming fluid tight seals and defining the aforesaid upper, lower, and permeate collection chambers. Alternatively, the circular collar can be welded to the two aligned, opposed tube sheets and this assembly is then fitted with flanges with which to mate with the upper chamber walls and permeate chamber walls of the pressure vessel. To insure structural integrity and achieve desired stiffness the tube sheets can be appropriately reinforced using beams running the diameter and/or chord lengths of the tube sheets. Alternatively, or in addition, support members tying the tube sheets together can be fitted between the opposing faces of the tube sheets and secured by bolts protruding through the opposite faces. When lengths of pipe are axially aligned with the holes through which the element central mandrels pass and welded in place between the opposing tube sheets, additional structural support means may not be needed. The bottom face of the second tube sheet forming the top of the permeate collection zone can be likewise separately reinforced by running support members under it.

In operation feed is introduced into the upper chamber by feed inlet means fitted in the upper chamber containment vessel wall. Feed fills the upper chamber and, under pressure, is forced into contact with the membrane layer in the spiral wound elements. The feed flow into the element through the feed/retentate spacer material, contacts the membrane and selected components permeate through the membrane and into other permeate envelope. Permeate in the permeate envelope moves through the envelope along the permeate spacer and passes into the hollow central mandrel. Retentate from the element passes through the element and exits into the lower chamber and is removed through the retentate outlet.

Permeate passing into the central mandrel collects in the permeate collection zone and is removed through the permeate outlet. Depending on the mode of operation this permeate removal can be accomplished either by simply permitting the permeate to drain from the chamber or a vacuum can be applied to draw the permeate through the membrane and withdraw it from the chamber.

Clearly, then, the multi-element housing lends itself to use under various separation environments. The element housing can be used under reverse osmosis or ultrafiltration conditions where the applied pressure on the feed provides the driving force for the separation. Alternatively, the housing can be used under pervaporation condition wherein a vacuum drawn on the permeate side of the element provides the driving force for the separation.

To be useful for perstraction a modification would have to be made to the elements.

Because in perstraction the driving force is provided by means of a sweep fluid which maintains the concentration gradient the element would have to be provided with means for supplying the sweep fluid.

In such a design the element would be fitted with a central mandrel open at both ends and extending beyond the edges of the spiral winding at both ends of the element. The central mandrel would be blocked at about the middle of its length thereby dividing the mandrel into two sections. The spiral winding defining the permeate envelope would likewise be modified in that the membrane sheets surrounding the permeate spacer material would be glued along 3 sides surrounding the permeate spacer and an additional glue line would be run down the center of the permeate spacer in the interior of the permeate envelope, parallel to the two parallel glued edges and extending about ½ the unwrapped length of the permeate envelope standing at the side nearest the mandrel, thereby dividing the permeate envelope into two separate internal zones near the mandrel with an open space between the 2 zones at the far end of the permeate envelope. This envelope would be in fluid communication through the fourth unglued edge with the divided central mandrel. The first zone in the permeate envelope would align with the first section of the mandrel while the second zone of the permeate envelope would align with the second section of the divided mandrel. The block dividing the mandrel would align with the glue line dividing the interior of the permeate envelope.

A sweep fluid would be introduced into the first section of the divided mandrel. The sweep fluid would circulate into the first section of the permeate envelope along the internal glue line then circle around the end of the internal glue line and move into the second section of the permeate envelope, all the while sweeping any permeate which passes through the membrane into the permeate envelope. The permeate and sweep fluid would exit the second section of the permeate envelope and pass into the second section of the divided mandrel through which it would pass into the permeate collection zone. Feed/retentate would still accumulate in the feed/retentate collection zone for recovery.

Multiples of such elements could be installed in the same way as any other element, the sweep fluid being introduced into the first section of the divided mandrel by sweep fluid manifold means such as individual sweep fluid tubes from an external source or through a sweep fluid circuit connecting the separate extended mandrel first sections in series or parallel from a single sweep fluid source.

As an alternative a removable third tube sheet can be attached in fluid tight communication around the extended mandrel first section in the upper chamber defining a sweep fluid introduction zone above the first chamber, but this has the draw back of reintroducing tube sheets at both ends of the membrane elements.

In order to maximize the flow velocities in the elements in the multi-element housing at a constant volumetric feed flow rate and, thereby minimize the feed side mass transfer resistance and operate at the highest feed Reynolds number possible resulting in higher permeation rates and improved element performance, the multi-element housing design can be modified by partitioning the lower chamber into a number of separate zones to thereby redirect the feed flow through separate isolated groups of parallel elements resulting in sequential flow through the separate groups of parallel element. The upper chamber can likewise also be partitioned to maximize the number of separate isolated element groups housed within a single housing. By this partitioning of the upper chamber and lower chamber a serpentine, cascading, serial flow of feed through the separated isolated element groups is achieved.

This partitioned embodiment will be best understood by reference to the following descriptions of specific variations.

The upper chamber of the aforesaid multi-element housing defined by the interior walls of the pressure containment vessel and the top face of a first tube sheet to which are attached multiple elements arranged in some pattern is treated as a single area. The lower chamber defined by the space between the bottom face of the first tube sheet and the top face of the second tube sheet is divided by partition means perpendicular to said tube sheets dividing the space into 2 zones. The partition is in fluid tight attachment to the opposing tube sheet faces and with the interior wall of the containment vessel.

Feed in introduced into one of the zones (the first zone) in the lower chamber through feed entrance means located in the vessel wall adjacent to this first zone and is forced up the elements aligned with the holes in the top tube sheet adjacent to the first zone. Permeate is collected through the central mandrel in the permeate collection zone. Feed/retentate empties from the first group of elements into the upper chamber and fills the upper chamber. When full the feed/retentate exits by passing through the windings of the second element group and empties into the second zone of the lower chamber and is removed therefrom through retentate removal means in the vessel wall adjacent to said lower chamber second zone. Permeate from the second group of elements is likewise collected in the permeate collection zone beneath the second tube sheet and removed through permeate removal means. In this embodiment a foraminous plate can be fitted around the upper ends of the elements opposite the first tube sheet. The plate need not be fluid tight around the elements nor in fluid tight contact with the interior vessel walls. Even a mesh can be used. The sheet is fitted around the ends of the elements slightly below the point at which feed exits or enters such element. Feed exiting the element will spill over the element edges and then pass through the plate to fill the body of the upper chamber. This creates a stagnant zone wherein feed exiting the top of the first group of elements fills the upper chamber under this plate and because of the presence of the plate cannot then readily mix with additional feed/retentate exiting the top of said first group of element. By keeping such mixing to a minimum the elements of the second group are not exposed to a feed mixture containing any stagnant fraction. This should reduce element fouling.

In another embodiment the upper chamber of the multi-element housing defined by the interior walls of the pressure containment vessel and the top face of a first tube sheet to which are attached multiple elements arrange din some pattern corresponding to and aligned with holes in the first tube sheet is divided into two separate zones by installation of a partition in said upper chamber, said partition being perpendicular to the tube sheet and corresponding to either the diameter of the housing or a chord of said housing. This partition is in fluid tight arrangement with said tube sheet and said pressure containment vessel walls. The end of the partition wall opposite to its edge of attachment to the first tube sheet is attached in fluid tight arrangement with either the top of the containment vessel or to a separate top plate which is parallel to the first tube sheet and is itself in fluid tight arrangement with the interior walls of the upper chamber of the pressure containment vessel.

The lower chamber defined by the space between the bottom face of the first tube sheet and the top face of the second tube sheet is similarly divided by a first partition extending the height of the space between the two tube sheets and in fluid tight attachment to said tube sheets and opposing containment vessel walls in the lower chamber, said first partition being substantially in a perpendicular relationship to the partition in the upper chamber and dividing the lower chamber into 2 separate zones. A second partition in the lower chamber substantially perpendicular to the first partition but extending from only one face of said first partition and attached to only one interior wall of the lower chamber is fitted to divide one of the two zones yet again into two additional smaller zones, the two partitions in the lower chamber thereby dividing the lower chamber into three zones, a first large zone and 2 additional zones each of which is approximately one half the size of the first zone (first and second smaller zones).

Feed is introduced into the first of the two smaller zones through feed inlet means in the lower chamber wall adjacent said first zone. Feed in the first zone is forced up through a first group of spiral wound elements and exits into the upper chamber, filling one of the two upper chamber zones and thereby cascading into a second group of spiral wound elements occupying said first zone of the upper chamber. The feed passes downward through the second group of spiral wound elements and exits as feed retentate into the large zone of the lower chamber wherein the feed retentate cascades through a third group of spiral wound elements and passes upward through the third group of elements into the second zone of the upper chamber wherein feed/retentate fills said second zone and subsequently cascades into a fourth group of spiral wound elements and passed downwardly through said fourth group of elements, the feed/retentate from the fourth group of elements exiting into the second of the smaller zones in the lower chamber corresponding to the feed/retentate accumulation zone from which it is removed via feed/retentate outlet means in the wall of the lower chamber adjacent to the feed/retentate accumulation zone.

Permeate collected in the central mandrels is passed through the open ends of the central mandrels into the permeate collection zone as previously described.

In this way the multi-element housing can be divided into any number of individual zones within each of the upper and lower chambers by the installation of partition barriers perpendicular to the tube sheets.

Expressed in general terms, the upper chamber is divided into 2 or more zones by the placement of a first or primary partition in the upper chamber corresponding substantially to the diameter or a major chord of the upper chamber, said first partition being perpendicular to the first tube sheet and in fluid tight attachment thereto and to the interior walls of the pressure containment vessel and dividing the chamber into 2 zones. A top plate is fitted to the top edge of the partition parallel to the first tube sheet and spaced some finite distance above the upper edge of the parallel spiral wound element mounted in the first tube sheet.

Additional zones are created by use of a second or more partitions hereinafter referred to as secondary upper chamber partitions fitted in the upper chamber extending from the first partition barrier preferably extending perpendicular from the first barrier thereby subdividing the original 2 zones into more numerous subdivision zones. These secondary upper chamber partitions are attached to the primary partition the interior upper chamber wall the first tube sheet and top plate in fluid tight arrangement. These zones and subdivision zones in the upper chamber result in the production of separate isolated element groupings in the upper chamber. The partitions in the lower chamber are arranged taking the placement of the upper chamber partitions into consideration and installed in said lower chamber so as to result in sepentine cascade flow the feed through the separate isolated element groupings in the upper chamber. Feed entry means are fitted in the containment vessel wall corresponding to a feed zone in the lower chamber while retentate removal means are fitted in the containment vessel wall corresponding to the last zone in the lower chamber at the end of the separative feed flow path.

The invention will be explained in detail by reference to the Figures.

FIG. 1 shows a multi-element housing comprising a pressure containment vessel (1) in which are mounted a plurality of spiral wound elements (2) attached in fluid tight arrangement to a first tube sheet (3) which is in open relationship with the interior windings of the spiral wound elements through holes ($H_1$) in the first tube sheet. This first tube sheet (3) is in fluid tight communication along its outer perimeter with the interior wall of the pressure containment vessel at (4) and thereby defines an upper chamber (5). The central mandrels (6) of the spiral wound element (2) extend into and through holes ($H_2$) in the second tube sheet (7) the extended mandrels being in fluid tight communication at their outer walls with the holes of the second tube sheet. The second tube sheet (7) is parallel to and spaced apart from the first tube sheet (3) and is in fluid tight communication with the interior walls of the pressure containment vessel (1) along its perimeter at points (8). The space between the opposing faces of the two tube sheets and the pressure containment vessel walls is defined as the lower chamber (9). The extended mandrels 6 passing through the second tube sheet (7) empty into permeate collection zone 10 defined by the bottom face of the second tube sheet (7) and the bottom of pressure containment vessel. Feed is introduced via feed inlet (11) into the upper chamber (5) and passes through elements (2). Permeate passes through the membrane leaves in the element and into the central mandrels (6) which empty into permeate collection zone 10 from which it can be withdrawn via permeate collection means (12). Feed and retentate which passes through the element empties into lower chamber (9) and is collected via retentate outlet (13).

Figure 2B:
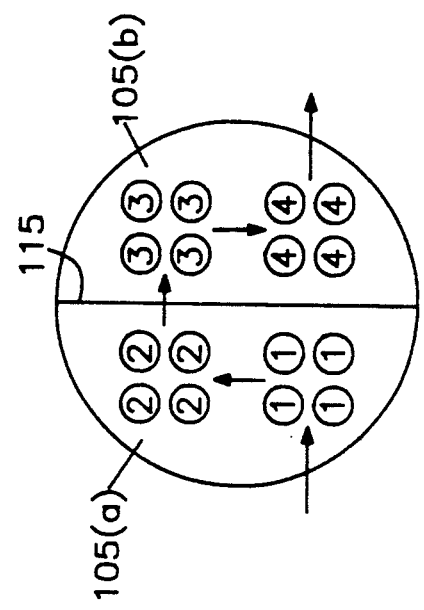
FIG. 2 is a schematic of an alternate embodiment of a multi-element housing of the present invention wherein partitions are employed to produce separate isolated element groupings for serpentine cascade feed flow.
Figure 2C:
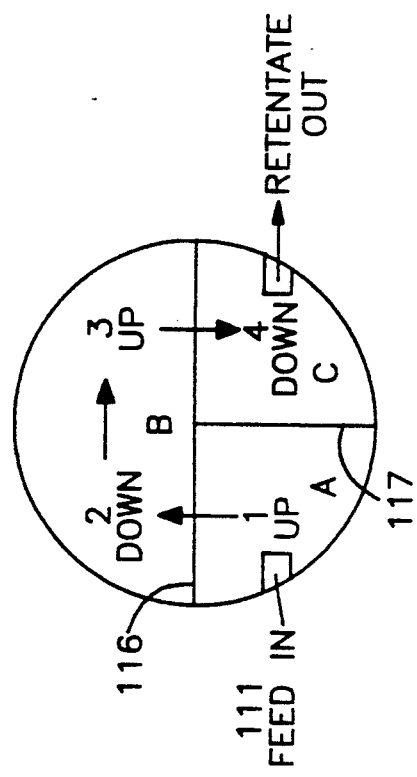
Figure 2A:
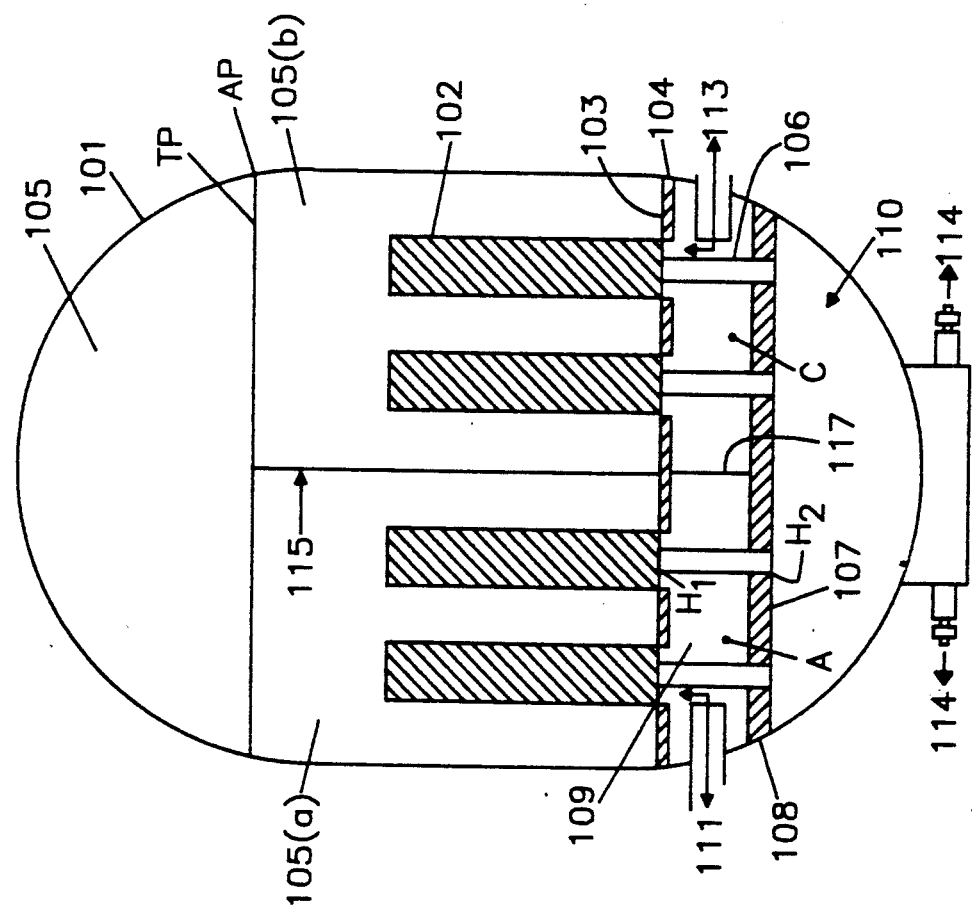

FIGS. 2a, 2b and 2c present an alternate embodiment of the present invention comprising a containment vessel 101 in which are mounted a plurality of spiral wound elements (102) attached in fluid tight communication to a first tube sheet (103) which is in open flow relationship through holes ($H_1$) with the internal windings of the spiral wound elements. This first tube sheet (103) is in fluid tight communication along its outer perimeter with the interior wall of the containment vessel at (104) thereby defining an upper chamber (105) which is pressure resistant. The central mandrels (106) of the spiral wound elements (102) extend into and through holes $H_2$ in a second tube sheet (107), the extended mandrels being in fluid tight communication along their outer walls with the holes ($H_2$) in the second tube sheet. The second tube sheet (107) is parallel to and spaced apart from the first tube sheet (103) and is also in fluid tight communication along its perimeter with the interior walls of the containment vessel at (108). The space between the opposing faces of the two tube sheets and the containment vessel walls defines a lower chamber (109). The extended mandrels (106) pass through the second tube sheet (107) and empty into permeate collection zone 110 defined by the bottom face of the second tube sheet (107) and the bottom of the containment vessel. The upper chamber (105) is divided into two separate zones by partition (115) perpendicular to and attached to the top of the first tube sheet 103 and the internal walls of the containment vessel and to a top plate (TP) which is parallel to the first tube sheet and is similarly in fluid tight communication along its perimeter with the interior wall of the containment vessel at attachment (AP) point, thereby dividing the upper chamber 105 into two zones (105(a)) and (105(b)). the lower chamber is similarly subdivided using partitions. Referring to FIGS. 2a, 2b and 2c a first lower chamber partition 116 (FIG. 2c) is fitted in fluid tight communication between the opposing faces of the tube sheets dividing the lower chamber into two zones. A secondary partition (117) (FIGS. 2a and 2c) is also fitted into the lower chamber extending radially from the first partition (116). The two partitions divide the lower chamber (109) into three separate zones, A, B and C. Feed is introduced through feed inlet (111) FIG. 2C into zone A, which feed flows up the spiral wound elements of element grouping 1 (FIG. 2b) into zone 105a (FIG. 2b) of the upper chamber and then down the elements of element grouping 2 (FIG. 2b) into zone B of the lower chamber (FIG. 2c) then up the elements of element grouping 3 (FIG. 2b) into upper chamber zone (105(b) FIG. 2b) then down the elements of element grouping 4 into lower chamber zone C (FIG. 2c) which functions as retentate collection zone (FIG. 2a) from which retentate is removed via outlet (113). Permeate collected in permeate collection zone (110) is removed via permeate outlet (114)(FIG. 2a).

Figure 3:
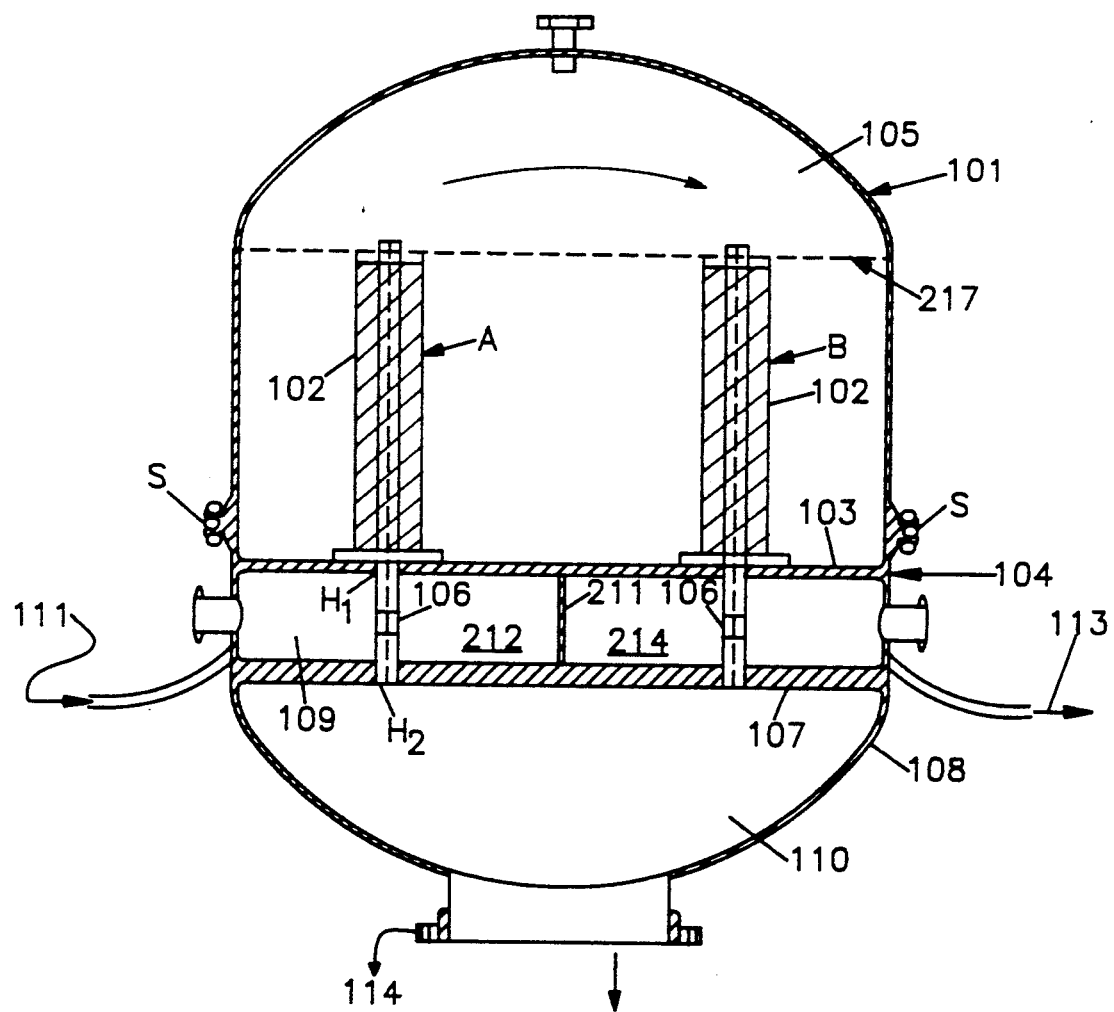
FIG. 3 presents a simplified modification of the separative flow pattern housing of the embodiment of FIG. 2 wherein only the lower chamber is subdivided.

FIG. 3 presents a modification of the embodiment presented in FIG. 2. Elements which are similar between the two representations share common numerical designation. Elements which differ are identified by numerical designations in the 200 series.

In FIG. 3 the multi-element housing comprises a containment vessel (101) in which are mounted a plurality of spiral wound element (102) attached in fluid tight communication to a first tube sheet (103) which is in open flow relationship through holes ($H_1$) in the first tube sheet with the internal windings of the spiral wound element. The first tube sheet (103) is in fluid tight communication along its outer perimeter with the interior wall of the containment vessel at (104) thereby defining an upper chamber (105) which is pressure resistant. The central mandrels (106) of the spiral wound element (102) extend into and through holes ($H_1$) in a second tube sheet (107), the extended mandrels being in fluid tight communication along their outer walls with the holes in the second tube sheet. The second tube sheet (107) is parallel to and spaced apart from the first tube sheet (103) and is also in fluid tight communication along its perimeter with the interior walls of the containment vessel at (108). The space between the opposing faces of the two tube sheets and the containment vessel walls defines a lower chamber (109). The extended mandrels (106) pass through the second tube sheet (107) and empty into permeate collection (110) defined by the bottom face of the second tube sheet and the bottom of the containment vessel.

The lower chamber (109) is divided into two zones by a divider (211) which is placed perpendicular between the opposing tube sheet and is in fluid tight communication along its edges with the tube sheet and the containment vessel walls in the lower chamber.

Feed is introduced into the feed zone (212) of the lower chamber through feed entrance means (111) and passes upwardly through the windings of a first group of spiral wound elements (A) which are in communication with the interior space of the first zone (212). Feed exits from the top of said first group of spiral wound elements and empties into the upper chamber, eventually filling the chamber and, thereby, then being forced to flow down the spiral winding of a second group of spiral wound elements (B) which are in communication with the second zone (214) of the lower chamber which functions as a retentate collection zone from which the collected retentate is removed via retentate removal means (113). Permeate is collected in the central mandrels of all the elements and is passed by the central mandrels into permeate collection zone (110) from which it is recovered via permeate collection means (114).

As an option a foraminous baffle (217) can be fitted near the tops of the spiral wound element in the upper chamber.

This baffle is not fluid tight. Feed exiting the top of spiral wound elements of group A can pass through the baffle and accumulate in the upper chamber. Once the level of feed in the upper chamber is higher than the baffle the presence of the baffle prevents the feed exiting the tops of the elements from mixing with feed which has accumulated in the upper chamber below the baffle. The feed below the baffle is held in which is in effect a stagnant zone isolated from fresh feed. Thus, stagnant feed is prevented from being fed into the spiral wound elements of group B. This prevents exposure of such elements to the sludge or other detrimental materials which might build up in stagnant feed which could plug or seriously degrade element performance. Periodically the stagnant feed below the baffle plate can be withdrawn through stagnant feed removal means (S).

Figure 4:
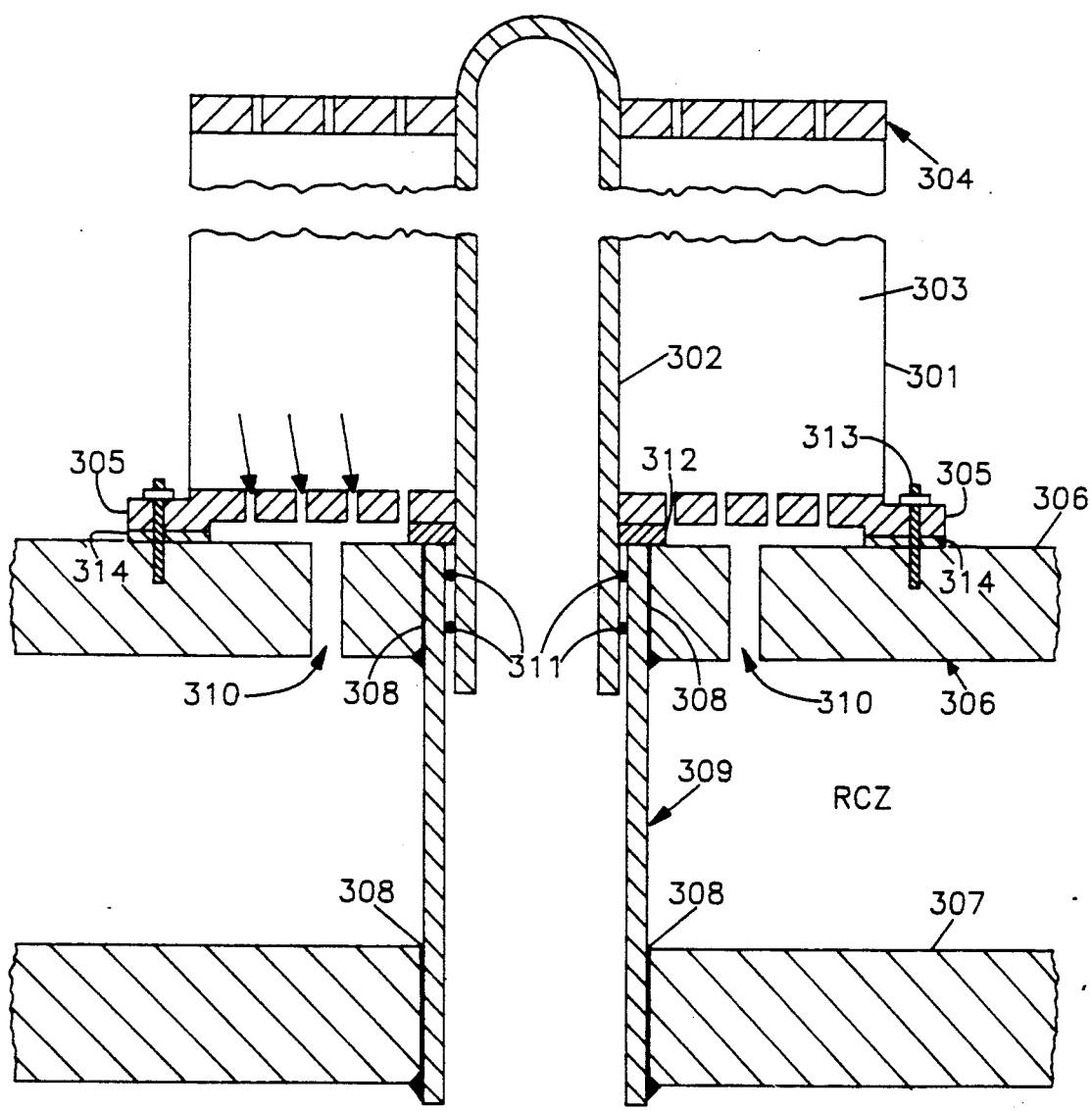
FIG. 4 presents an embodiment of the element mounting in the housing of the present invention.

FIG. 4 presents a preferred embodiment of the mounting of the spiral wound elements to the tube sheet and the segregation of the upper chamber from lower chamber and permeate collection zone.

A single spiral wound element is shown 301. This element contains a central mandrel 302 surrounded by the winding of membrane feed and retentate spacers 303. The ends of the element are capped. At the top the element is capped with end piece (anti-telescoping device) 304 which is open and permits fluid passage therethrough.

The bottom of the element is end capped with an anti telescoping device which also serves as a mounting flange 305. The upper or first tube sheet 306 and the lower or second tube sheet 307 are both perforated by axially aligned conduit holes 308 which are connected by means of a piece of pipe 309 welded into the holes and joining them, the piece of pipe serving as a conduit. The first tube sheet is also perforated by a series of secondary holes 310 clustered around the conduit holes 308 but spaced so as to be totally within the area circumscribed by the circumference of the spiral wound element. Feed/retentate passing through the winding of the spiral wound element exit the element and pass through these secondary holes (310) into the retentate collection zone (RCZ) between the two tube sheets. The spiral wound element is mounted by inserting the central mandrel into the conduit pipe joining the axially aligned holes in the two tube sheets. Fluid tight communication is achieved by applying sealant in the space between the outer wall of the central mandrel and the inner wall of the conduit pipe. The sealant can take the form of "O" rings (311) fitted around the mandrel and/or a compressing gasket (312) placed around the mandrel and fitted between the top face of the first tube sheet and the bottom face of the anti-telescoping mounting flange but not overlapping retentate passage holes 310. The element is secured to the top tube sheet using studs 313 is the tube sheet which mate with holes in the mounting flange 305. Fluid tightness is achieved by use of a gasket 314 placed at the interface between the tube sheet and the mounting flange.

Figure 5:
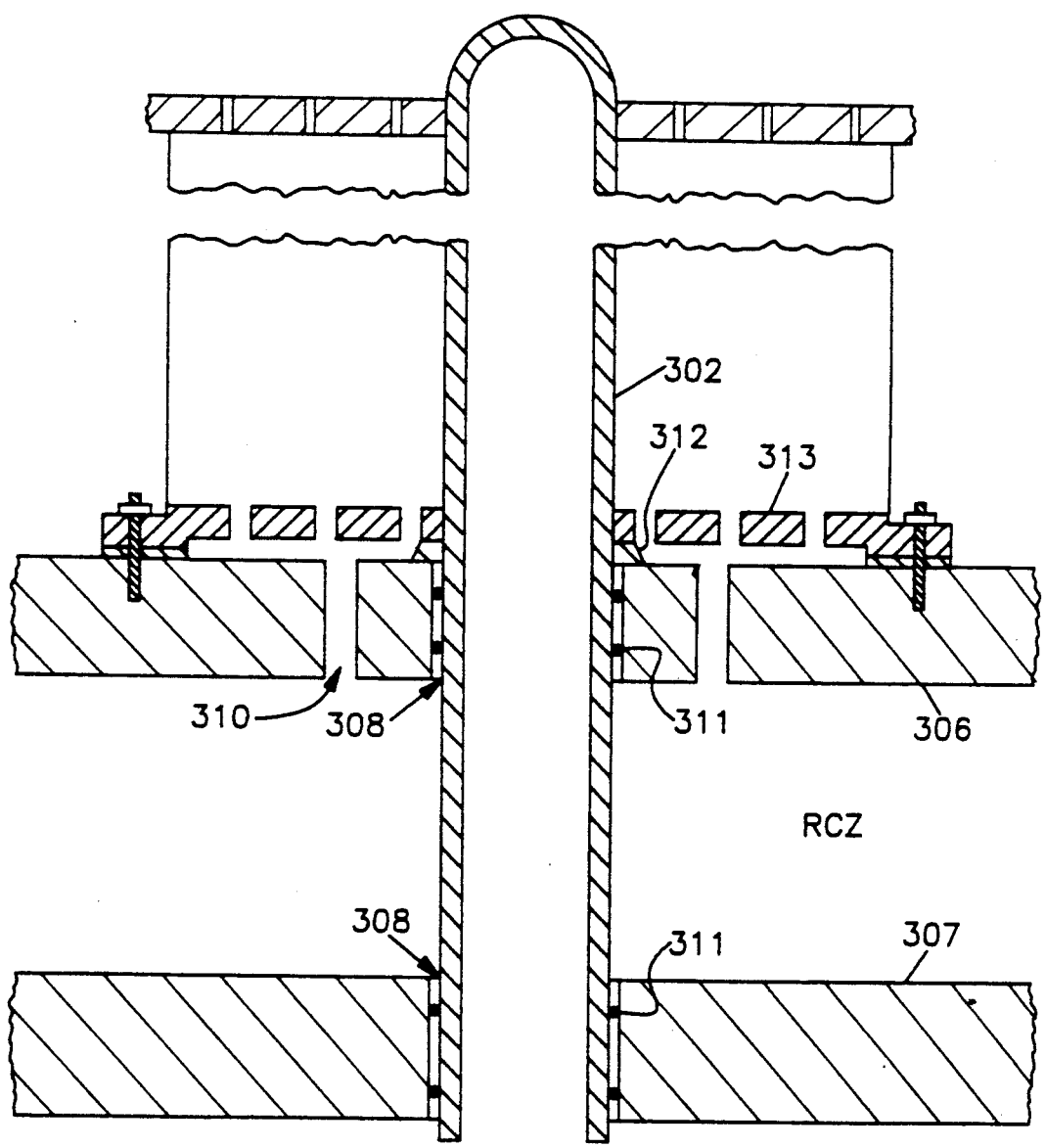
FIG. 5 presents a variation on the embodiment of FIG. 4.

FIG. 5 presents a variation on the embodiment of FIG. 4 wherein the holes (308) in the first tube sheet (306) and the second tube sheet (307) are not connected by a length of pipe but rather simply aligned and pierced by the central mandrel 302 of the membrane element. Fluid tight connections are achieved by use of "O" rings (311) between the opposing faces of the central mandrel and the holes (308) in tube sheets (306) and (307). Gasket means (312) between the top tube sheet 306 and the anti-telescoping device (313) can also be used to create a fluid tight seal (see FIG. 4).

What is claimed is:

1. A membrane element housing (1) for the containment of multiple membrane elements (2) wherein said multiple elements are in parallel arrangement, said housing comprising first (3) and second (7) supporting tube sheets in a containment vessel wherein both tube sheets are arranged in parallel to each other and located in close proximity to each other within the containment vessel in fluid tight arrangement with the interior walls of the containment vessel and wherein a lower chamber feed/retentate space (9) is defined between the two tube sheets, an upper chamber (5) is defined by the space above the first tube sheet within the containment vessel and a permeate chamber (10) is defined by the space below the second tube sheet within the containment vessel, multiple membrane elements in the upper chamber are aligned with holes ($H_1$) in the first tube sheet and are in fluid tight attachment with said tube sheet wherein the membrane element is in fluid communication with the lower chamber feed/retentate zone between the first and second tube sheets and wherein a central permeate mandrel (6) closed at the top and open at the bottom in said membrane elements passes through the feed retentate zone (9) between the two tube sheets and is in fluid tight communication with the second tube sheets but in fluid communication through its open bottom end with the permeate chamber (10), through holes ($H_2$) in the second tube sheet, wherein fluid at the exterior of the elements is prevented from leaving the upper chamber through said holes $H_1$, except by passage through the membrane element attached to said first tube sheet, said upper chamber being fitted with feed entry means (11) in the wall of the containment vessel corresponding to the upper chamber, said lower chamber feed/retentate zone between the first and second tube sheets being fitted with retentate withdrawal means (13) in the wall of the containment vessel corresponding to the feed/retentate zone and said permeate chamber being fitted with permeate withdrawal means (12) in the wall of the containment vessel corresponding to the permeate chamber.

2. The housing of claim 1 wherein multiple membrane elements are fitted into holes in the first tube sheet which holes are equal in diameter to the external diameter of the elements.

3. The housing of claim 1 wherein the central mandrels (302) of multiple membrane elements (301) are fitted into holes (308) in the first tube sheet (306) wherein said mandrels pass through said holes in said first tube sheet and are in fluid tight arrangement with the second tube sheet (307) but in fluid communication with the permeate chamber through holes (308) in said second tube sheet, and wherein said central mandrel holes (308) in the first tube sheet (306) are surrounded by a pattern of secondary holes (310), said pattern of secondary holes being bounded by the perimeter of the element through which secondary holes the membrane element is in fluid communication with the feed/retentate zone (RCZ) between the two tube sheets.

4. The housing of claim 3 wherein the holes (308) in the first and second tube sheets through with the central mandrel (302) passes are connected by lengths of pipe (309) of internal diameter sized to receive the external diameter of the extended central mandrel and its sealing device and which pipes are in alignment with said opposing holes and are in fluid tight attachment with the opposing tube sheet faces.

5. A membrane element housing for the containment of multiple membrane elements wherein said multiple membrane elements are in parallel arrangement, said housing comprising a containment vessel (101) wherein said containment vessel is divided into an upper chamber (105) defined by the interior walls of the containment vessel and the upper face of a first tube sheet (103) in fluid tight attachment (104) to said interior walls, a lower chamber (109) defined by the interior walls of the containment vessel and the bottom face of the first tube sheet (103) and the upper face of a second tube sheet (107) parallel to and in close proximity to said first tube sheet and a permeate chamber (110) defined by the interior walls of the containment vessel and the bottom face of the second tube sheet, multiple elements (102) arranged in said upper chamber in alignment with holes ($H_1$) in the first tube sheet in fluid tight attachment with said tube sheet in the upper chamber but wherein the membrane element is in fluid communication with the lower chamber between the first and second tube sheets and wherein central permeate mandrels (106) closed at the top and open at the bottom in said membrane elements passes through said lower chamber (109) into holes $H_2$ in the second tube sheet (107) and are in fluid tight attachment with said second tube sheet in the lower chamber (109) but which central mandrels are in fluid communication through their open ends with the permeate chamber (110) and wherein the lower chamber is divided by partition means (211) perpendicular to said tube sheets thereby dividing the said lower chamber into a first (212) and a second (214) zone, said partition means being in fluid tight attachment to the opposing tube sheet faces and with the interior walls of the containment vessel, said containment vessel wall in the area of the first zone in the lower chamber being fitted with feed entry means (111), and said containment vessel wall is the area of said second zone being fitted with retentate removal means (113) and the containment vessel walls in the area of the permeate chamber being fitted with permeate removal means (114).

6. The housing of claim 5 wherein a foraminous plate (217) is located near the top of the membrane element opposite the first tube sheet.

7. The housing of claim 5 or 6 wherein the lower chamber (109) is divided into multiple zones by multiple partition means wherein a first partition (116) mans perpendicular to the tube sheet is in fluid tight arrangement with said tube sheets (103 and 107) and with the walls of the containment vessel and a second partition means (117) perpendicular to the tube sheets and perpendicular to said first partition means (116) is in fluid tight arrangement with said tube sheets and with the first partition and with the interior wall of the containment vessel thereby dividing the lower chamber into 3 zones, a first major zone (B) and first (A) and second (C) minor zones, and the upper chamber (105), is divided into multiple zones by a partition means (115) perpendicular to the first tube sheet (103) and in fluid tight attachment to said tube sheet and the interior walls of the containment vessel thereby dividing the upper chamber into two independent fluid tight zones (105(a) and 105(b)) and wherein the upper chamber partition means is in a substantially perpendicular relationship to the first partition in the lower chamber and wherein feed entrance means (111) are fitted in the containment vessel wall corresponding to the first minor zone (A) in the lower chamber (109), retentate removal means (113) are fitted in the containment vessel wall corresponding to the second minor zone (C) in the lower chamber (107) and permeate removal means (114) are fitted in the containment vessel wall corresponding to the permeate zone (110) thereby resulting in serpentine feed flow through the elements in the separate zones in the upper chamber (105).

8. The housing of claim 5 or 6 wherein the upper chamber is divided into multiple zones by placement of a primary partition in the upper chamber, said first partition being perpendicular to the first tube sheet and in fluid tight attachment thereto and to the interior walls of the containment vessel and by placement of secondary partition fitted in the upper chamber extending from said primary partition and in fluid tight attachment to said primary partition and to said first tube sheet and the interior walls of the containment vessel thereby dividing the upper chamber in numerous discrete fluid tight zones containing isolated multiple element groups, said lower chamber being divided into multiple zones by means of partitions placed in said lower chamber and arranged therein taking the placement of the upper chamber partitions into consideration so as to result in serpentine cascade flow of feed through the isolated multiple element group in the upper chamber, wherein feed entry means are fitted in the wall of the containment vessel corresponding to a first zone in the lower chamber and retentate removal means are fitted in the wall of the containment vessel corresponding to the last zone in the lower chamber at the end of the serpentine feed flow path.

* * * * *